Aug. 7, 1934.   H. G. ROBINSON   1,969,238
METHOD AND MEANS OF SUBMERGED CUTTING
Filed May 4, 1932   3 Sheets-Sheet 1
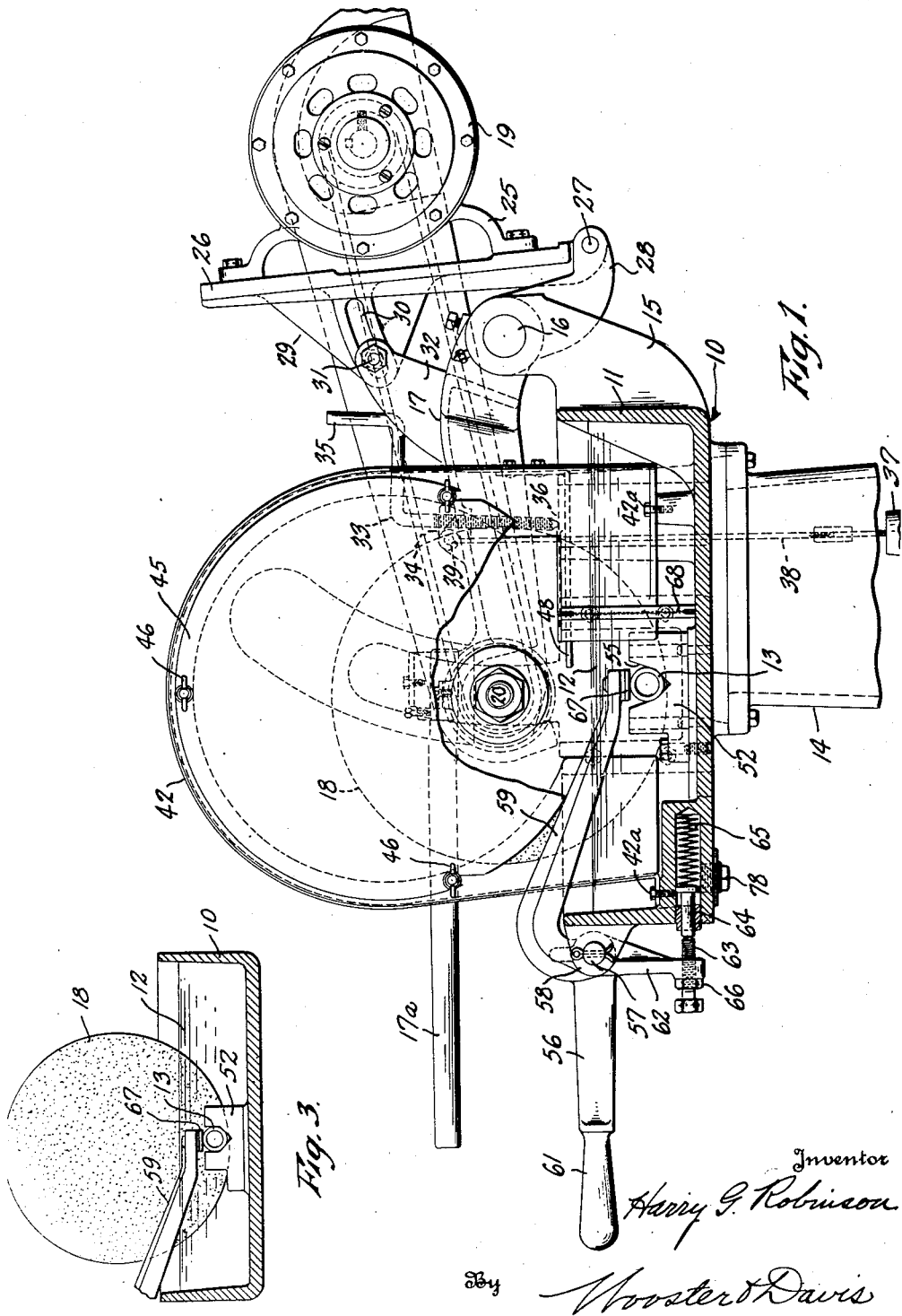

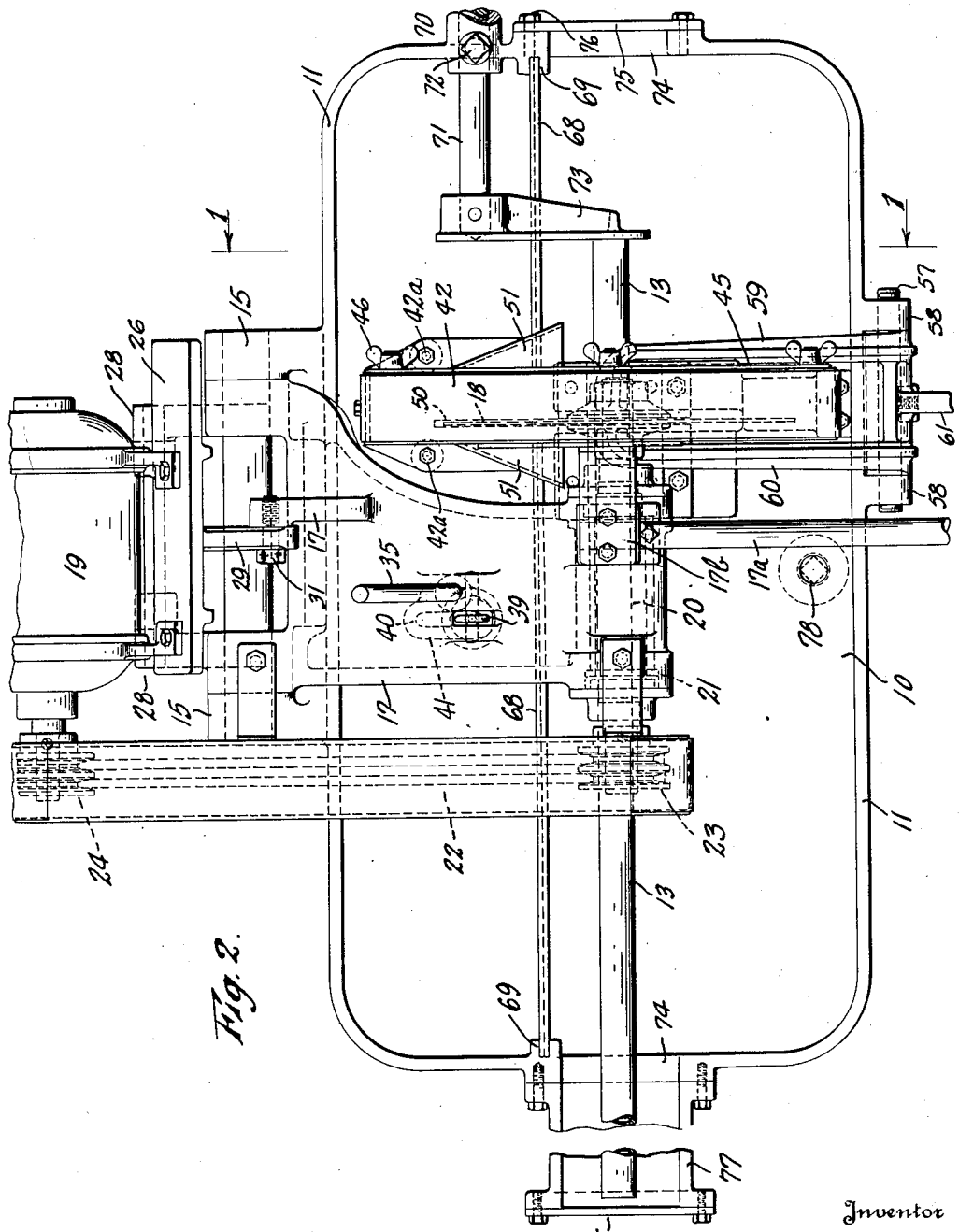

Aug. 7, 1934.  H. G. ROBINSON  1,969,238
METHOD AND MEANS OF SUBMERGED CUTTING
Filed May 4, 1932   3 Sheets-Sheet 3

Inventor
Harry G. Robinson
By Wooster & Davis
Attorneys

Patented Aug. 7, 1934

1,969,238

UNITED STATES PATENT OFFICE 1,969,238

METHOD AND MEANS OF SUBMERGED CUTTING

Harry G. Robinson, Stratford, Conn., assignor to Industries of America, Incorporated, Bridgeport, Conn., a corporation of Delaware Application May 4, 1932, Serial No. 609,148

9 Claims. (Cl. 51—278)

This invention relates to an improved method and means for cutting various articles, a very useful application being to cut off rods, bars, tubes, and the like to various lengths, although the invention is by no means limited to such use, but is adapted for a large variety of cutting operations.

It is an object of the invention to provide an improved method and means for cutting various articles to give a straight clean cut and in a more expeditious manner, and also to cut various articles which heretofore have been very difficult to cut, and in some cases even were considered impossible to cut to leave a straight flat end.

The invention involves as a main feature cutting of the work with a thin abrasive wheel while the work is submerged in a liquid, which may be water or any other suitable liquid, water having been found to be very satisfactory. I have found that when cutting metals with a thin abrasive wheel while the metal being cut is entirely submerged in the liquid a smooth clean cut can be secured with practically no burr on the edge of the cut and with no burning or undue heating of the metal. I have also found that various other substances, such as glass, either as a rod or a tube, porcelain, or similar materials which have heretofore been considered as being impossible to cut with a smooth square cut, can be readily and quickly cut with my invention, and the cut can be square and with a smooth surface and with very little or no chipping at the edges of the cut.

It is also an object of the invention to provide improved means for carrying out my improved method of cutting and for accomplishing the results above mentioned.

With the foregoing and other objects in view the invention consists in a certain method and improved means for carrying out the method as will be more clearly disclosed in connection with the accompanying drawings, but it is to be distinctly understood that I am not limited to the specific apparatus shown, but the method may be carried out in various other constructions.

In these drawings:

Fig. 1 is a vertical transverse section substantially along the line 1—1 of Fig. 2;

Fig. 3 is a vertical section substantially in the plane of Fig. 1 and showing somewhat diagrammatically the principle of the invention;

Fig. 7 is a longitudinal vertical section indicating an arrangement for the work holding means and the cutting wheel for cutting long bars and rods without requiring an excessively large liquid container.

Figure 2:
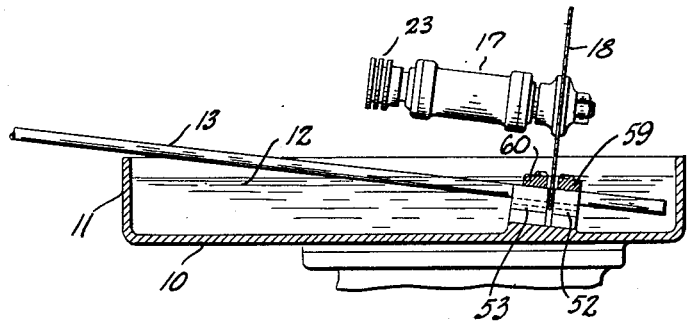
Fig. 2 is a top plan view of the device.
Figure 4:
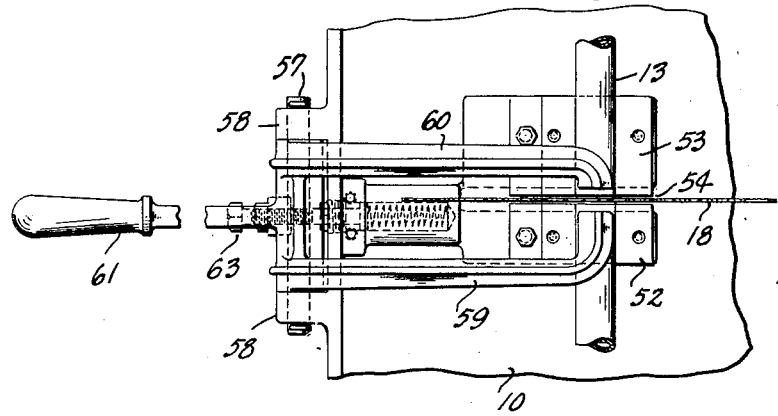
Fig. 4 is a top plan view of a clamping means for the work.
Figure 5:
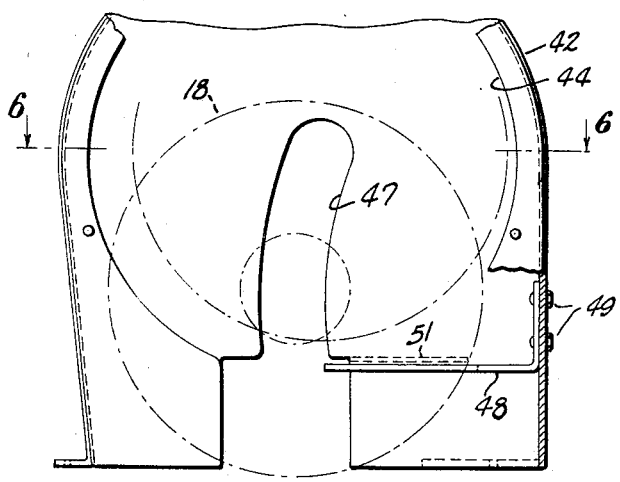
Fig. 5 is a partial side elevation and partial section of the guard for the wheel.
Figure 6:
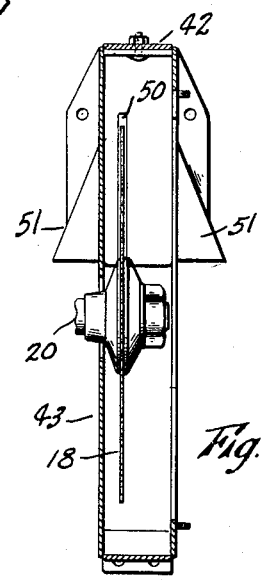
Fig. 6 is a section thereof substantially on line 6—6 of Fig. 5.

As mentioned above the main feature of the invention resides in the cutting of the work by means of a thin abrasive wheel while the portion of the work being cut is submerged in a liquid, such for example as water, and I have found that for satisfactory results the material being cut should be entirely submerged in the liquid during the cutting operation. For example, I have found that heavy steel bars or thin metal tubes can be cut quickly while submerged in the liquid with no burning of the metal and with practically no burr on the edge of the cut, which is a result which has never before been possible with known cutting methods. I have also found that with this method glass tubes of thin walls can be easily and quickly cut while submerged in the liquid giving a clean square cut with practically no chipping on the edges of the cut. This is a result that heretofore has been considered impossible.

The reason for securing these extraordinary results is not entirely clear, but it is believed that in the case of the glass cutting the liquid practically or entirely eliminates vibrations within the glass and the wheel. Also the wheel acts as a circulating pump to circulate large quantities of liquid through and over the cut during the cutting operation which quickly and thoroughly clears the cut and wheel from all chips and prevents overheating of either the material being cut or the wheel. In dry cutting there is a large amount of heat generated and probably particles of molten metal are thrown off, but with my method of submerged cutting it is believed that the operation is entirely a cutting action.

I have discovered that the temperature of the liquid has considerable to do with the results secured. Thus if the temperature of the water gets down to as low as 45 degrees Fahrenheit the results are unsatisfactory. The action improves as the temperature of the liquid increases so that it appears that the higher the temperature the better. Preferably it should be above ordinary room temperature or 70 degrees, but of course, for ordinary operation it should be cool enough to permit the operator to place his hands in it with comfort.

I have found that thin abrasive wheels are apparently the most satisfactory, probably for one reason because the thinner the wheel the narrower the cut and the less work to be done. The power required in this cutting device using submerged cutting is much reduced over that required for dry cutting with otherwise the same conditions. I have found that wheels from about .020 inch to about 3/64 of an inch thick will work very satisfactorily. With a wheel 12 inches in diameter a thickness of about .030 inch seemed about the best. These thicknesses are given merely as examples but they may vary considerably depending on the work to be done, and in some classes of work much greater thicknesses may be used. It was also found that the speed of the wheel did not need to be excessive, and as a matter of fact if the speed was too high it would not cut properly. Satisfactory results were secured with a wheel running at about 1200 to 1400 R. P. M. while speeds of 1800 to 2000 were even better. However, when the speed was increased to 2800 R. P. M. operation was not satisfactory because at this speed the wheel seemed to carry air into the cut which tended to keep the liquid out of it, and there was burning of the material and also of the wheel. This therefore seemed to indicate that the speed of the wheel should be as high as conveniently possible, but should not be above a speed where the surface of the wheel is not moistened by the liquid.

It has been found that in this submerged cutting the wheel wears much less rapidly than in dry cutting, and therefore a much larger number of cuts can be secured with a given wheel. This method of cutting has been found very satisfactory in cutting tubes, either of metal or of glass, or similar materials, even where the walls were very thin. This is probably due somewhat to the fact that as the article being cut is submerged in the liquid the liquid is in contact with all surfaces both inside and outside the tube and that there is a very rapid circulation of the liquid through and around the tube and within the cut. This liquid seems to eliminate vibration in the tube and also in the wheel, and the rapid circulation of the liquid quickly and thoroughly carries the cuttings out of the cut and keeps it entirely clean. It also uniformly distributes the cuttings on the bottom of the liquid tank or container so that they do not pile up under the wheel.

Referring now to the accompanying drawings in which a satisfactory embodiment of a machine is shown which has proved very satisfactory and efficient in the cutting off of rods, bars and tubes of various materials. This construction comprises a bed or container 10 having upright peripheral walls 11 to form a reservoir or container for the liquid indicated at 12, such for example as water, in which the work, shown in the present instance as a tube 13, is submerged during the cutting operation. This bed or container may be mounted on any suitable support, such as a pedestal 14. The container may be provided with rearwardly extending ears 15 on which may be pivotally mounted as by a shaft 16 a frame 17 carrying the abrasive cutting wheel indicated at 18 and the power means for driving this wheel, such as an electric motor 19. In the present instance the wheel is removably mounted on a shaft 20 running in anti-friction bearings 21 in the frame 17, and is driven by a suitable flexible drive, such as a V-belt drive 22 running over pulleys 23 and 24 on the shaft 20 and the armature shaft of the motor. It is also preferred to provide some means for adjusting the tightness of this belt drive, and in the present instance the motor is carried on a frame 25 secured to an upright bracket 26 pivoted in the frame 17 at 27 between arms 28. This bracket 26 also has a lug 29 provided with an arcuate slot 30 struck with the pivot 27 as its center. An adjustable clamping bolt 31 carried by the lug 32 on the frame 17 provides a means for holding the bracket 26 in adjusted positions.

It will be noted that the wheel 18 with its mounting means and the motor 19 are mounted on opposite sides of the pivot 16 for the frame 17, and therefore these elements counter balance each other so that in swinging the frame to move the wheel to and from the work very little effort is required. The motor should preferably over balance the wheel somewhat so as to retain the wheel in the upright position between the cutting operations. An adjustable limit stop is carried by the frame 17 to limit downward movement of the wheel to prevent its being shifted too far. In the construction shown this comprises a rod 33 threaded into a lug 34 on the frame and having a crank handle 35 whereby it may be adjusted. At its lower end it is adapted to engage an upwardly extending stop wall 36 carried by the container 10 to limit downward movement of the wheel. As the motor is usually considerably heavier than the abrasive wheel and associated parts a counter weight 37 may be hung by a rod 38 to the frame at 39 and passing up through a slot 40 in upwardly extending walls on the lower wall of the container 10. The frame 17 may be rocked on its pivot to shift the wheel to and from the work by any suitable handle 17a adjustably secured to the frame at 17b.

The wheel should be enclosed in a suitable safety guard so that should it break there will be no flying pieces to injure the operator. This guard is illustrated as a sheet metal member 42 extending over and enclosing the wheel and including an enclosing wall 43 on one side. On its opposite side it has an opening 44 of sufficient diameter to permit insertion and removal of the wheel for application to and removal from the driving shaft 20. After the wheel is applied this opening is closed by a cover plate 45 detachably secured in position by any suitable means, such as thumb nuts 46. The rear wall 43 is provided with an arcuate slot 47 through which the shaft 20 extends and permits up and down movement of the wheel. The guard may be mounted by any suitable means. In the present construction it is secured to the container 10 by screws 42a.

As the wheel 18 during the cutting operation rotates with its lower portion in the liquid it will be evident that it tends to carry this liquid up into the guard. To prevent this a stripper plate 48 is provided above the top of the liquid 12 and extending laterally on opposite sides of the rear portion of the wheel. This plate may be mounted on the guard as indicated at 49 and may comprise a single plate 48 with a narrow slot 50 permitting just sufficient clearance for the wheel to rotate in it. This plate effectively strips the liquid from the wheel and prevents any objectionable amount being carried up into the guard.

It will also be evident that rotation of this abrasive wheel in the liquid causes rapid circulation of the liquid and violent agitation around and to the rear of the point of cutting. To prevent this liquid being thrown out over the rear edge of the container other baffle plates 51 extend laterally from the side walls of the guard and deflect this liquid back into the container.

Of course the work to be cut must be held in the proper position submerged in the liquid in the container. I have found that satisfactory means for doing this are supporting blocks 52 and 53 separated by a narrow space 54 to permit the abrasive wheel 18 to pass between them. These blocks have suitably shaped notches 55 to receive the work indicated in the present instance as the tube 13. These notches may be of various shapes but they are preferably tapered so that the work is firmly held. Manually operated means are also provided for clamping or holding the work in these supporting blocks. In the present instance this clamping means comprises a lever 56 pivoted at 57 to lugs 58 on the forward wall of the container 10, and this lever includes a pair of spaced arms 59 and 60 extending at their free ends over the blocks 52 and 53. They are spaced sufficiently to permit the wheel 18 to pass between them, and these arms with the blocks 52 and 53 provide means for clamping and holding the work on both sides of the wheel. The handle 61 permits lifting of the arms 59 and 60 to release the work and also to control the movement of the arms 59 and 60 to the work holding position. It has been found advisable however to provide yielding resilient means for holding these clamps against the work as this has proven more satisfactory. Thus the lever 56 is provided with an arm 62 carrying adjusting screw 63 threaded in the arm and engaging the end of a slidable plug 64 mounted in a recess in the container 10. In this recess is a spring 65 which tends to force the plug 64 out against the screw 63 and to clamp the arms 59 and 60 down on to the work. After adjustment the screw 63 may be locked in adjusted position by lock nut 66, and it will be evident that with this construction the tension of the spring may be adjusted and therefore the pressure of the clamp on the work.

It has been found that in cutting glass tubes and particularly tubes with thin walls they should not be clamped too firmly. This adjustment of the pressure of the spring 65 is very effective in securing the proper yielding resilient pressure. It also seems advisable to have resilient yieldable pads to press on the top of the work, especially when cutting glass tubes, and I therefore use such pads 67, preferably of live rubber which appears to assist in eliminating vibration of the work.

As there is rapid circulation and violent agitation of the liquid during the cutting operation a certain amount of foam may form on the surface thereof and interfere with visability of the work. As this is carried to the rear of the container 10 by the action of the wheel, upright screens 68 may be mounted on opposite sides of the wheel somewhat to the rear of the work 13. As shown these screens have a sufficieint height to extend from the bottom of the container to a suitable distance above the surface of the liquid, and they may be mounted for easy insertion or removal in upright guideways 69 in the walls of the container. It will thus be seen that as the liquid is carried to the rear of the container by the action of the wheel it flows laterally in opposite directions toward the opposite ends of the container and then forwardly. In flowing forwardly it must pass through these screens and the scum will be collected and held by them. This scum also holds some of the particles removed by the cutting operation and thus helps to clear the liquid. These screens also collect a large part of the dirt and particles of grit from the wheel and the particles removed from the work, keeping the liquid carried into the cut by the wheel relatively free from these materials.

In cutting off work to given lengths an adjustable stop means is usually provided for engagement by the end of the bar or tube from which the lengths are cut. In the present instance an end wall of the container 10 is provided with a boss 70 in which a rod 71 may be adjustably secured as by set screw 72. A stop 73 mounted on this rod may project down into the liquid in alignment with the work and form an adjustable limit stop for the work being cut.

It will be evident that in cutting long tubes or bars if the entire tube or bar is to be submerged in the liquid a long container 10 will be required. Excessively long containers would be objectionable and therefore means are provided whereby the effective length of a container of relatively small size may be increased as desired. For this purpose the opposite end walls of the container 10 are provided with notches 74 in alignment with the work holding clamps. If the work being cut is of relatively short lengths these notches may be closed by detachable plates 75 held thereover by any suitable means such as the clamping screw 76. If longer lengths are to be cut these plates may be removed and troughs 77 of any suitable length secured with an open end in alignment with these notches as indicated at the left side of Fig. 2. These troughs may be made in relatively short or various lengths and secured together to secure any length desired, and then the outer end closed by the plate 75 which has been removed from the notch 74. Thus the liquid in this trough will submerge the entire rod or bar. Any suitable means, such as a drain plug 78, may be provided for draining the liquid from the container.

If it is not desirable to use these extension troughs the clamps for the work may be inclined or tipped from the horizontal as indicated in Fig. 7. This permits the work, such as the bar 13, to pass over the edge of the container 10 while the portion of the work which is being operated upon is submerged in the liquid. Of course with this arrangement if right angle cuts are desired the cutting wheel 18 should also be tipped as indicated so as to rotate in a plane substantially at right angles to the axis of the work. In this case a container of the ordinary size may be used in cutting work of any length desired.

The clamps or holding means may be mounted on a support and the liquid container or tank lowered away from them while the work is being secured in position. Then the container can be moved upwardly to submerge the work in the liquid before the cutting operation. This gives complete visibility while securing the work as it is not secured while submerged in the liquid.

In cutting the work submerged as described the surrounding liquid appears to take out or practically eliminate vibration of the work and the wheel so that a good clean square cut is secured, and very thin wheels which may be easily broken with a slight lateral pressure of the hand will satisfactorily cut the material without breaking. With this submerged cutting there is practically no noise and there is no dust to injure the workman and therefore no separate suction devices for removing the dust is required. There is practically no heating of the material as it is maintained at substantially the temperature of the liquid, and it has been found that in cutting steel or similar material there is practically no burr at the edge of the cut. As indicated above the rotation of the wheel within the liquid causes a rapid circulation of the liquid through the cut and over the surfaces being cut. In the case of hollow tubes there is a very rapid circulation not only through the cut but also through the tube itself insuring thorough clearing of the cut and preventing heating of the material.

As to the wheel itself various materials can be used. I have found I can use any wheel with a suitable abrasive, such as carborundum, emery, or any other suitable abrasive material. I am also not limited to any particular binder for the abrasive in the wheel, as rubber, shellac, synthetic resins, and the like have been found to be satisfactory, and it has been found that due to the liquid on the surface of the wheel and in the cut the wheel does not heat up and therefore such binders as rubber and the like are not burned as they would be in dry cutting, and the wheels wear much longer and much more work can be done with the same wheel.

Having thus set forth the nature of my invention, what I claim is:

1. The method which comprises cutting work submerged in a liquid with the periphery of a rotating, thin, substantially flat wheel of abrasive material, and rotating the wheel at a speed sufficient to produce the desired rate of cutting and not over a speed that would prevent the surface of the wheel in the liquid remaining wet.

2. The method of cutting which comprises submerging the work to be cut in a liquid, and causing the active portion of a thin edge of abrasive material to alternately engage and move away from the work while so submerged by rotating said edge while against the work at a speed sufficient to produce the desired rate of cutting and not over a speed that would prevent the surface of the edge in the liquid remaining wet.

3. The method which comprises submerging work to be cut in a body of water and cutting a narrow slot in the work by rotating a thin wheel composed of abrasive particles held together by a binder with the edge of the wheel against the submerged work, and with a portion only of said edge against the work so that all portions of the cutting edge move alternately to and from the work, and rotating the wheel at a speed sufficient to produce the desired rate of cutting and not over a speed that would prevent the surface of the wheel in the liquid remaining wet.

4. The method which comprises cutting a narrow slot in work with the periphery of a thin wheel composed of abrasive material while the work is submerged in a liquid and with a portion only of the periphery engaging the work, and rotating the wheel at a speed sufficient to produce the desired rate of cutting and not over a speed that would prevent the surface of the wheel in the liquid remaining wet.

5. The method of cutting a tube which comprises submerging the tube in a liquid so that both the outer and inner surfaces of the portion to be cut are in contact with the liquid, and rotating a thin abrasive wheel with its periphery against said portion while it is so submerged to cut a narrow transverse slot in the tube and at a speed sufficient to produce the desired rate of cutting and not over a speed at which the surface in contact with the work remains wet.

6. The method of cutting which comprises holding the work submerged in a liquid with a yieldable resilient clamping means, and cutting a narrow slot in the work by rotating a thin abrasive wheel with a portion only of its edge against the work and while it is so submerged and at a speed sufficient to produce the desired rate of cutting and not over a speed that would prevent the surface of the wheel in the liquid remaining wet.

7. In a machine of the character described, a container for holding liquid, means for clamping work submerged in said liquid, a side wall of said container being provided with a notch, a trough in alignment with said notch and forming an extension of said container to hold submerged articles held by said clamping means, means for detachably securing the trough to the container, an abrasive wheel, and means for moving the wheel to and from the submerged work.

8. In a machine of the character described, a container to hold liquid, clamping means for holding work to be cut submerged in said liquid, a thin abrasive cutting wheel, means for moving the wheel to and from the work, and upright screens extending laterally from opposite sides of the wheel to the rear of the work mounted so the liquid must pass through them in flowing from the rear to the forward portion of the container.

9. In a machine of the character described, a container to hold liquid, means for holding the work to be cut submerged in the liquid, a thin abrasive upright cutting wheel, means for moving the wheel to and from the submerged work, and a plate extending laterally on opposite side of the wheel above the liquid to the rear of the work to strip the liquid from the surface of the wheel.

HARRY G. ROBINSON.